(12) United States Patent
Chamberlain et al.

(10) Patent No.: US 7,472,385 B2
(45) Date of Patent: Dec. 30, 2008

(54) METHOD AND COMPUTER-READABLE MEDIUM FOR INSTALLING AN UPGRADE TO AN APPLICATION PROGRAM

(75) Inventors: Benjamin C Chamberlain, Redmond, WA (US); Robert C Collie, Redmond, WA (US); Darrin N Hatakeda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 10/843,267

(22) Filed: May 10, 2004

(65) Prior Publication Data

US 2004/0210893 A1    Oct. 21, 2004

Related U.S. Application Data

(63) Continuation of application No. 09/261,863, filed on Mar. 3, 1999, now Pat. No. 6,735,766.

(51) Int. Cl.
*G06F 9/445* (2006.01)
*G06F 9/44* (2006.01)

(52) U.S. Cl. .................. 717/172; 717/169; 717/171; 717/175; 717/176; 717/177

(58) Field of Classification Search .................. None
See application file for complete search history.

(56) References Cited

U.S. PATENT DOCUMENTS

| | | |
|---|---|---|
| 5,586,304 A | 12/1996 | Stupek, Jr. et al. |
| 5,600,834 A | 2/1997 | Howard |
| 5,675,831 A | 10/1997 | Caputo |
| 5,732,275 A | 3/1998 | Kullick et al. |
| 5,742,829 A | 4/1998 | Davis et al. |
| 5,764,992 A | 6/1998 | Kullick et al. |
| 5,953,533 A | 9/1999 | Fink et al. |
| 5,960,189 A * | 9/1999 | Stupek et al. .............. 717/169 |
| 5,966,540 A | 10/1999 | Lister et al. |
| 5,991,774 A | 11/1999 | Tate et al. |
| 6,009,274 A | 12/1999 | Fletcher et al. |
| 6,189,146 B1 | 2/2001 | Misra et al. |

(Continued)

OTHER PUBLICATIONS

Kelly, M., "Gain Control of Application Setup and Maintenance With the New Windows Installer," *Microsoft Systems Journal*, Sep. 1998, pp. 15-27.

*Primary Examiner*—Chuck O Kendall
(74) *Attorney, Agent, or Firm*—Christensen O'Connor Johnson Kindness PLLC (57) ABSTRACT

A method and computer-readable medium for upgrading an application program, and making an installer program aware that an application has been upgraded is disclosed. The method recognizes that an upgrade to the application has been initiated. The upgrade includes an identifier for the application to be upgraded, as well as information required for the installer to perform the upgrade. The installer program accesses the upgrade information, which includes instructions necessary for installing the upgrade. The installer program also accesses information related to the installed state of the application and related applications. The installer program determines whether or not the upgrade should be performed. If the upgrade should be performed, the installer program performs the upgrade and stores the fact that the application has been upgraded. If the application should not be upgraded, the installer program stores information reflecting the fact that the upgrade is available but not installed.

4 Claims, 10 Drawing Sheets

U.S. PATENT DOCUMENTS 6,202,207 B1     3/2001  Donohue
6,237,144 B1 *   5/2001  Delo .......................... 717/174

2004/0210893 A1 * 10/2004  Chamberlain et al. ....... 717/168

* cited by examiner

METHOD AND COMPUTER-READABLE MEDIUM FOR INSTALLING AN UPGRADE TO AN APPLICATION PROGRAM

CROSS-REFERENCE TO RELATED APPLICATION

This application is a continuation of prior application Ser. No. 09/261,863, filed Mar. 3. 1999, priority from the filing date of which is claimed under 35 U.S.C. § 120.

FIELD OF THE INVENTION

This invention relates generally to the installation of software applications on a computer system, and more specifically, to upgrading a software application program on a computer system.

BACKGROUND OF THE INVENTION

Software application installation is an area of increasing importance. Unfortunately, existing installation technologies fail to address all of a computer user's needs. Most installation technologies are simply brute-force mechanisms for copying program files from one location to another. Only one known installer program, Microsoft Windows Installer, developed by Microsoft Corporation, Redmond, Wash., even comes close. For a description of Microsoft Windows Installer, see Kelly, Mike, "Gain Control of Application Setup and Maintenance with the New Windows Installer," *Microsoft Systems Journal*, pp. 1527, Sep. 1998.

The one installer program that comes closes to addressing all of a computer user's needs manages the installation of an application so that information related to each of the application's resources is stored in a "configuration database." The configuration database may be registry keys within a system registry, or it may be a stand-alone database. The stored information includes, but is not limited to, the installed state of the application, i.e., what features of the application are or are not installed, whether the application should be run locally or run from a source, paths to the program files of the application, whether features are "advertised" (i.e., available but not installed), etc. The stored information is stored at install time and is used by the installer program to ensure that an application always has available the resources that it expects or that the user requests. For instance, one function of the installer program is to verify the existence of a resource needed by the application. When the application requests a path to a program file, the installer program verifies the existence of that program file at the expected location stored in the configuration database. If, for some unexpected reason, the program file does not exist at the expected location, the installer program installs the program file prior to returning its path to the application. The installer program continually updates the configuration database if any changes are made to the installed state of the application.

Once installed, there may be a need to change an application. Generally speaking, changes to an application may be minor, in which case a patch is desirable, or changes may be more significant, in which case an upgrade is desirable. For example, patching may be performed if an application is in need of a service release or update to remedy a programming bug or other infirmity, whereas an upgrade will be performed for a new release. The present invention is directed to upgrades, as opposed to patches. There are several problems with traditional methods of upgrading software applications.

First, traditional methods of upgrading software applications modify the resources of the application, but do not modify the configuration database maintained by the installer program to reflect those modifications. For example, an upgrade will often add a new program file to the application. However, the upgrade does not modify the configuration database to make the installer program aware of the existence of the new program file. In addition, the installer program is unable to update its configuration database to reflect the existence of the new file because the upgrade and new file were not installed by the installer program. The result is that the installer program is unaware that the new program file was added, so any additional functionality provided by the installer program is unavailable for that new program file. For example, the installer program is unable to verify the existence of the new program file if requested by the application.

Another problem with traditional methods of upgrading software applications is that they may not be able to properly upgrade an uninstalled or partially-installed application. At installation, the user may choose not to install all of the features of an application, but rather delay the installation of certain features until they are actually used. The installer program may provide an application with the ability to offer the feature as available although the feature is not installed ("advertising" the feature). When the user or application attempts to access that feature for the first time, the installer program automatically installs the advertised feature. This reduces the amount of storage space consumed by features of an application that are not initially used.

Yet another problem with traditional upgrades is that there is not a standard. This forces authors to create custom upgrade logic. This in itself is a significant problem, however, the problem is compounded in that this custom logic trickles down to the user. This means that upgrades of different products may have different installation procedures from the perspective of a user.

Accordingly, there exists a need in the art for an improved method of upgrading a software program that provides standardization from the perspective of both the author of the upgrade and the user installing the upgrade. In addition, a need exists for a method of upgrading a software program that can determine if any older versions of the software program are installed and act accordingly. Furthermore, the actions taken, i.e., current install state of the software program, should be stored.

SUMMARY OF THE INVENTION

The present invention is directed to a method, and computer-readable medium for upgrading an application using an installer program. The installer program recognizes that an upgrade to the application has been initiated. The upgrade includes an identifier for the application to be upgraded, as well as information required for the installer to perform the upgrade. The installer program accesses the upgrade information, which includes instructions necessary for installing the upgrade. The installer program also accesses information related to the installed state of the application and related applications. The installer program determines whether or not the upgrade should be performed. If the upgrade should be performed, the installer program performs the upgrade and stores the fact that the application has been upgraded. Preferably, this is accomplished by unregistering the previously installed application and registering the upgrade, i.e., newly installed application.

In accordance with other aspects of the invention, the application is identified using a unique identifier known as a product code. Alternatively, the application is identified using a product-identifying triplet composed of an upgrade code, a version number, and a language code.

In accordance still other aspects of the invention, the installer program determines if there are newer versions of the product installed. If there are newer versions of the product installed, a default is set so that the upgrade is not installed. Preferably, this default can be overridden. If there are not newer versions of the application installed, the upgrade should be installed.

In accordance with further aspects of the invention, the installer program checks to see if there are previous versions of the product or related products installed. If there are previous versions of the product or related products installed, the installer program determines if the upgrade can coexist with the previous version or related products. If the upgrade can not coexist with previous versions of the product or related products, the previous version or related products that can not coexist with the application upgrade, are removed. Preferably, the installer program presents the user options based on this information. For example, if two products can not coexist, a message is displayed to the user. The user can decide whether to remove the installed version of the product and install the upgrade, or cancel the upgrade without removing the installed version of the product.

In accordance with still further aspects of the invention, the upgrade includes an upgrade table. The upgrade table includes a list of entries for products related to the application upgrade. Each entry provides directions specifying how the related product is to be treated. For example, whether previous products or related products can coexist with the upgrade. Preferably, each upgrade table entry includes: an upgrade code; a version number; a language code and an attribute field. An example attribute field is a coexist value.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a method and computer-readable medium for upgrading a software application and providing an installer program with notice of an upgrade's existence so that the installer program can modify a configuration database to reflect the upgrade. Simply stated, the present invention makes the installer program upgrade-aware so that should the user or application make or require any changes to the installed state of the application, the installer program will be able to operate on the system resources with knowledge that the application has either been upgraded, or that an upgrade is present for the application. Briefly described, the present invention provides a mechanism by which the launching of an upgrade file, is passed to the installer program and the installer program takes control of installing the upgrade. In this manner, the installer program is able to store information related to the upgrade to ensure the proper operation of the installer program and proper upgrading of the application.

Exemplary Operating Environment

Figure 1:
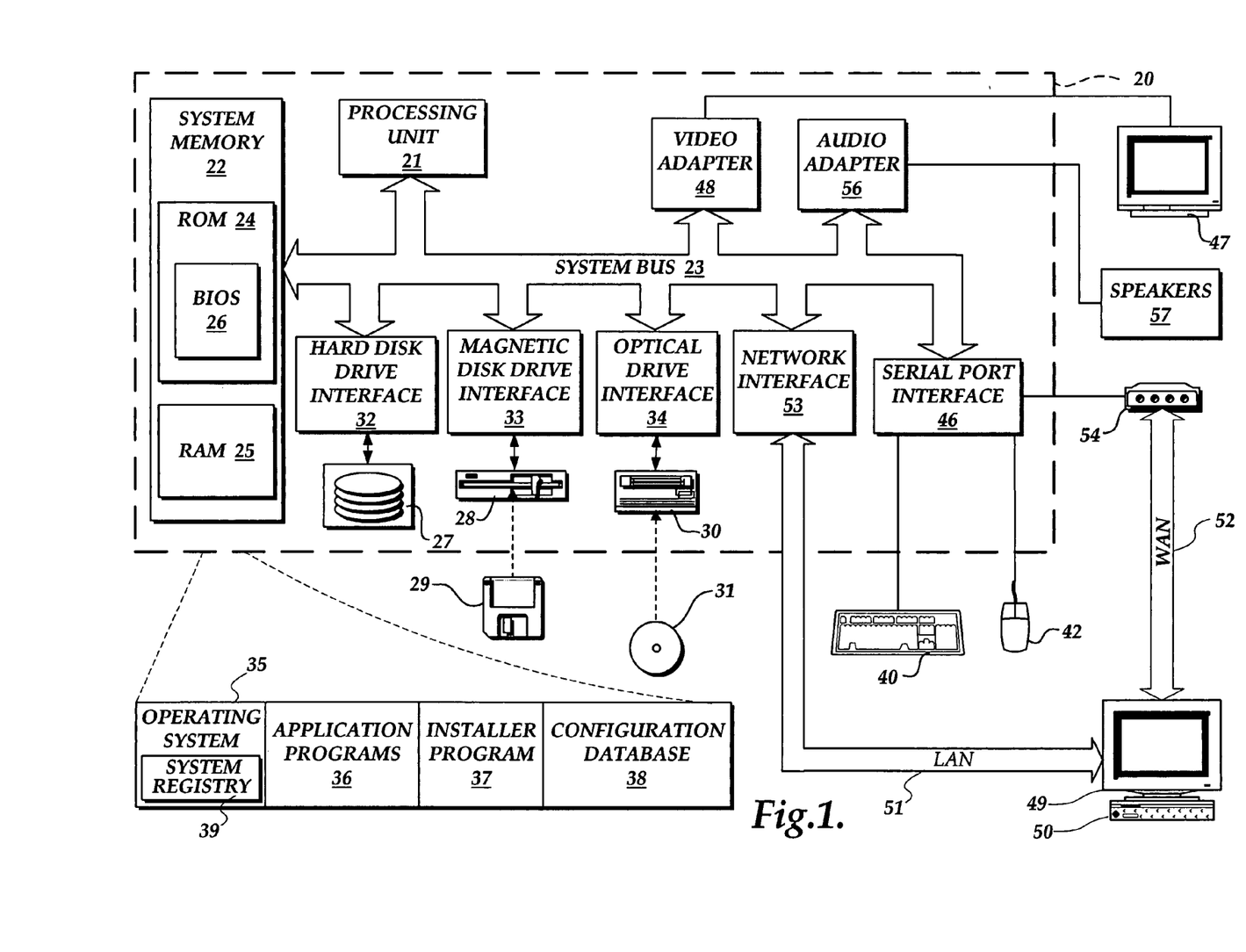
FIG. 1 is a block diagram of a general purpose computer system suitable for implementing the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as an installer program 37 in accordance with an exemplary embodiment of the present invention, and program data, such as a configuration database 38 associated with the installer program 37. The operating system 35 may include a system registry 39. In this embodiment, the invention may reside within the installer program 37 and the configuration database 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Discussion of Terminology

Figure 2:
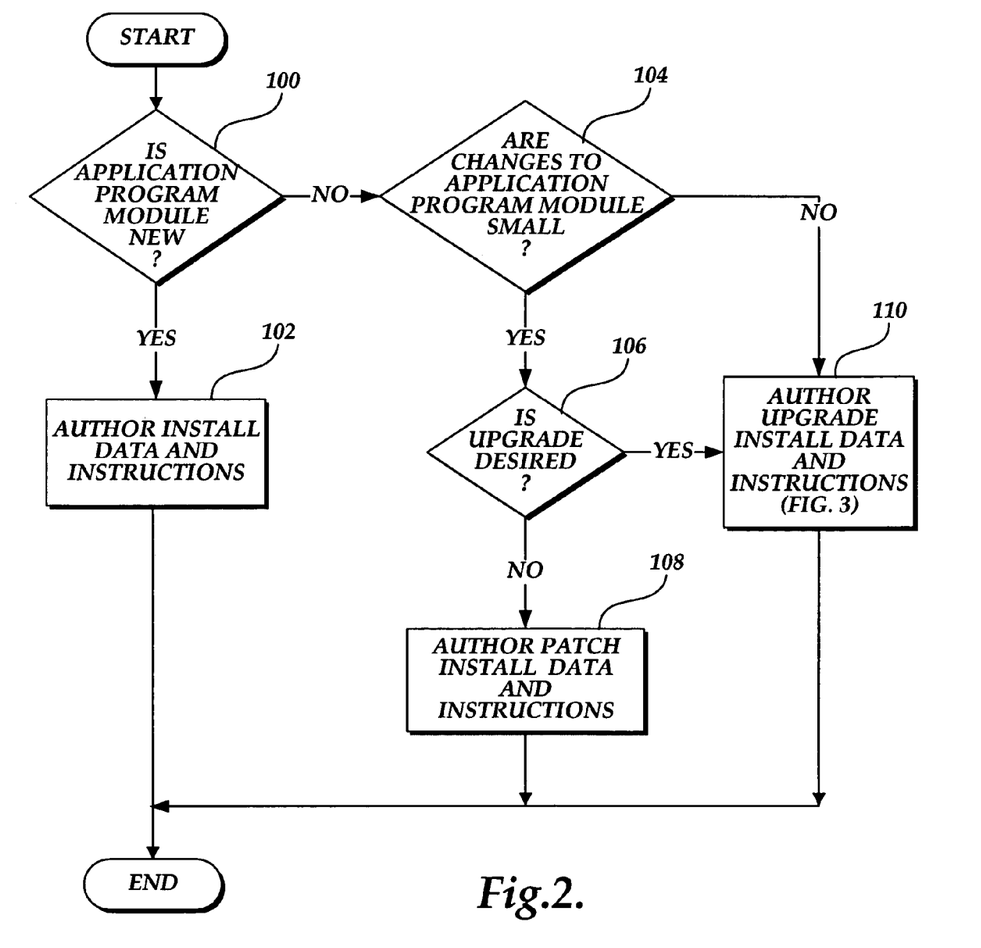
FIG. 2 is a flow diagram illustrating the overall logic used by an author to provide set-up information to be used by an installer program formed in accordance with the present invention.

Before discussing FIG. 2, a brief discussion of terminology is needed. In accordance with an exemplary embodiment of the present invention, the installer program module 37 recognizes three principal elements: products, features and components. A "product" represents a single, entire application program, such as the "MICROSOFT WORD" application program marketed by Microsoft Corporation of Redmond, Wash. Each product has a globally unique identifier known as a Product Code that allows each product to be distinguished. Each product is made up of one or more features. A feature is a granular piece of the product that a user may choose to install or execute. Features typically correspond roughly to the functional features of the product itself, such as a "Proofing Tools" feature. Each feature is essentially a grouping of components and may also include other features. Features need not be globally unique, and therefore may be identified by any appropriate means, such as with a textual feature identifier.

A component is a collection of resources, such as files or registry keys, that are all installed or uninstalled as a unit. Components are the building blocks of the product that are not exposed to the user. A resource, such as a file or a registry key, may be part of only one component. Two components may not share the same resource whether they are part of the same product or parts of different products. Each component has a globally unique identifier known as a Component Code. One resource within the component is designated as a key file. The key file may be any resource, such as a file or registry key, within the component.

Authoring Upgrade Installation Data and Instructions

FIG. 2 is a flow diagram illustrating the logic used by the author of data to be used by an installer program. A preferred installer program installs new applications, installs upgrades to installed applications, and installs patches to installed applications. The flow diagram of FIG. 2 illustrates the overall logic used by an author to generate setup information (i.e., install data and instructions) for any of the above. It will be appreciated that the actual changes to or creation of the application program module are assumed to have occurred independently of (preferably before) the logic shown in FIG. 2.

The logic of FIG. 2 moves from a start block to decision block 100 where a test is made to determine if the application program module is a new program module. If so, the logic moves to block 102 where install data and instructions are authored. Included with the install data and instructions are a product code and a product-identifying triplet composed of an upgrade code, a version number, and a language code. The product code is a unique identifier that is used for identification of a product. For example, the product code is used to determine if a patch should be applied to the product. The product-identifying triplet also uniquely identifies the product, however, it also allows for products to be distinguished as groups. The product-identifying triplet is used during the upgrade process, for example to determine which related products should be removed. Use of the product-identifying triplet with respect to the installation of a product upgrade is discussed in more detail later. Install data and instructions, while very similar to upgrade data and instructions, are not the subject of the present invention, and are not discussed in further detail. Install data and instructions are included and/or referenced in an installation file.

If the application program module is not new, the logic moves from decision block 100 to decision block 104 where a test is made to determine if the changes to the application program module are small. Generally speaking, small changes are implemented via a patch, while large changes are implemented via an upgrade. However, an author may implement a small change via an upgrade. It will also be appreciated that large changes can be implemented using a patch. However, this is not preferable, and is therefore not shown in FIG. 2. A distinction between patches and upgrades is that patches generally just make changes to the existing set of features and files, whereas an upgrade generally adds new features and components. If in decision block 104 it is determined that the changes to the program module are small, the logic moves to decision block 106 where a test is made to determine if an upgrade is desired. If so, the logic moves to block 110, which is described below. If not, the logic moves to block 108 where patch install data and instructions are authored. Patch install data and instructions, although similar to upgrade data and instructions as mentioned above, are not the subject of this invention, and are therefore not described in further detail. Patch install data and instructions are included in a patch package.

Figure 3:
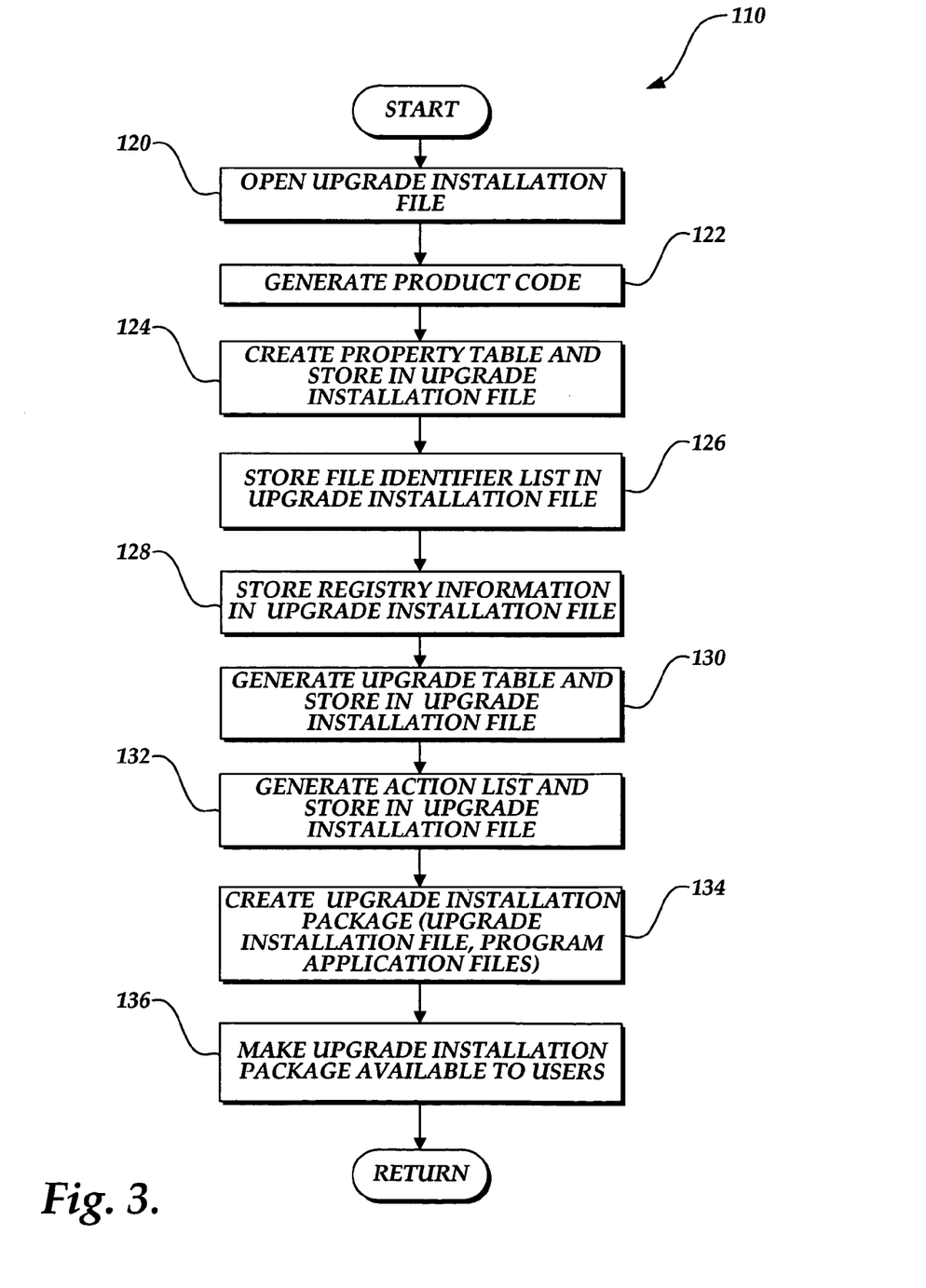
FIG. 3 is a flow diagram illustrating in detail the logic of authoring upgrade data and instructions.

If in decision block 104 it is determined that changes to the application program are not small, or if changes are small, but the author desires an upgrade (yes in decision block 106), the logic moves to block 110 where upgrade install data and instructions are authored. The logic of block 110 is illustrated in detail in FIG. 3, and discussed below. After installation data and instructions have been authored (block 102), patch data and instructions have been authored (block 108), or upgrade data and instructions have been authored (block 110), the logic of FIG. 2 ends.

Figure 4A:
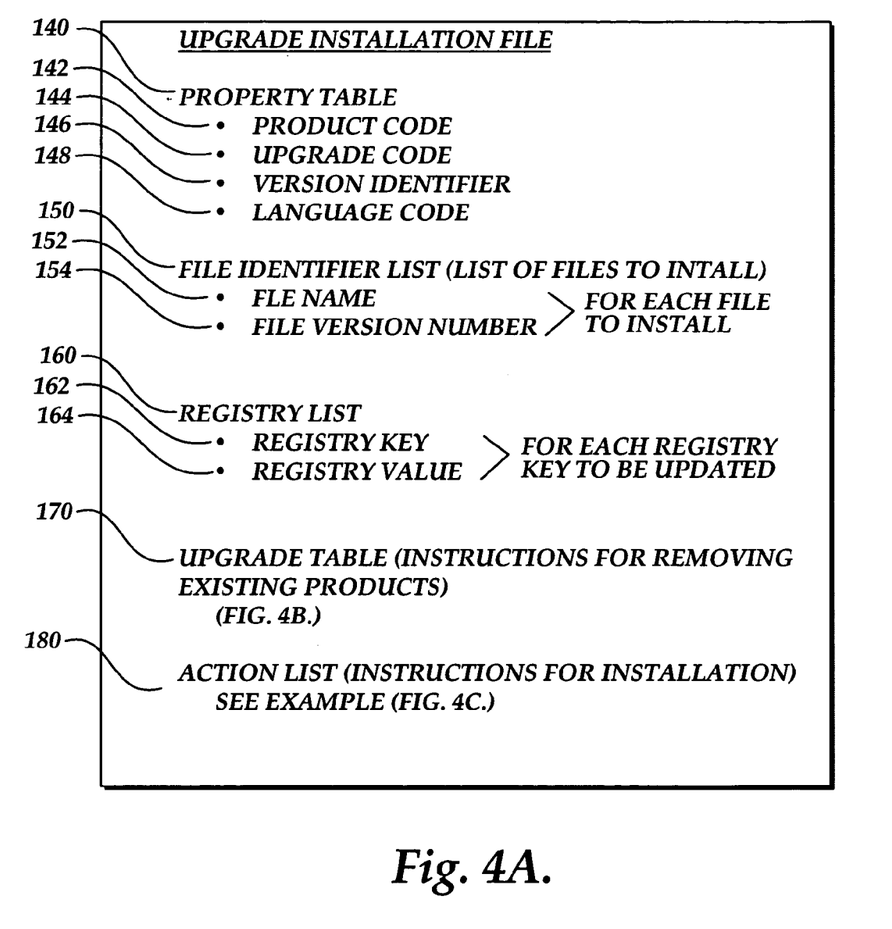
FIG. 4A is a pictorial representation of an exemplary upgrade installation file.

Install data and instructions are included in and/or referenced by an installation file. The logic of authoring upgrade install data and instructions (FIG. 3) moves from a start block to block 120 where an upgrade installation file is opened. An example of an upgrade installation file is illustrated in FIG. 4A, and described below. Next, in block 122, a product code for the product to be upgraded is generated. Preferably, a facility is available for an author to generate a unique product code, such as through an application programming interface (API) call made available as part of a set of authoring tools used to create the upgrade install data and instructions. Alternatively, a product code may be selected from a list of reserved product codes. The logic then moves to a block 124 where a property table is created and stored in the upgrade installation file.

Referring to FIG. 4A, the property table 140 includes a product code 142, an upgrade code 144, a version identifier 146, and a language code 148 for this particular product. The product code of FIG. 4A is the unique product code generated in block 122 of FIG. 3. The product code is equivalent to a product-identifying triplet consisting of an upgrade code, a version identifier, and a language code. The product code and product-identifying triplet allow other products to install subsequent patches and upgrades, respectively.

Returning to FIG. 3, after the property table has been stored in the upgrade installation file, a file identifier list is stored in the upgrade installation file in block 126. As shown in FIG. 4A, the file identifier list 150 includes a file name 152 and a file version number 154 for each file that is to be installed for the upgrade.

Returning again to FIG. 3, registry information is stored in the upgrade installation file, in block 128. As shown in FIG. 4A, the registry list 160 includes a registry key 162 and an associated registry value 164 for each registry key to be updated for the upgrade.

Returning once more to FIG. 3, after the registry list has been stored in the upgrade installation file, an upgrade table is generated and stored in the upgrade installation file. See block 130. The upgrade table 170 (FIG. 4A) includes instructions for removing existing products. An example of an upgrade table 170 is shown in detail in FIG. 4B.

Figure 4B:
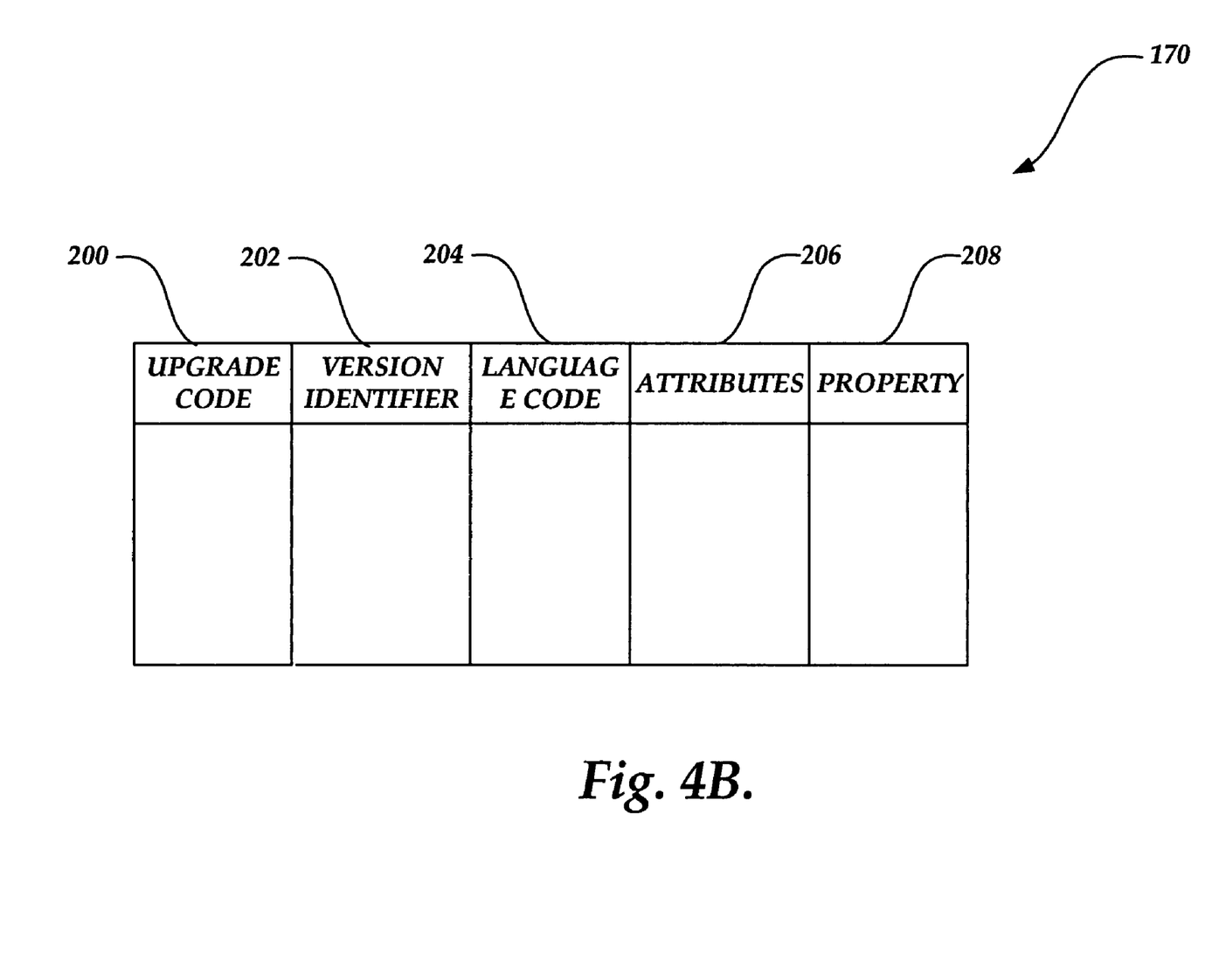
FIG. 4B is a pictorial representation of an upgrade table included in the upgrade installation file of FIG. 4A.

The upgrade table shown in FIG. 4B includes the following columns: an upgrade code 200, a version identifier 202, a language code 204, attributes 206, and a property 208. The author places entries for previous versions of the product and related products in the upgrade table. As will be described next, each entry in the upgrade table can identify a single product or multiple products. The upgrade table provides a list of products to search for and instructions for how to deal with any installed products that match an upgrade table entry. The upgrade code 200 identifies the family of related products referenced by each particular record in the upgrade table. This is a required field in the herein described embodiment of the invention and must be set for each entry in the upgrade table. The version identifier identifies the version of the product being searched for, e.g., 1.0. The version identifier may be a range of values, for example, 1.0-3.0, or <3.0. The version identifier can also be left blank. If it is blank, any version will be deemed a match (i.e., blank is equivalent to a wildcard). The language code 204 specifies which languages are being searched for. It cannot be a range, but, it can be a list of language codes. The language code can also be left blank, in which case it is treated as a wildcard. The "NOT" operator can also be used with the language code. For example, if the upgrade is for an English version of the product, an entry relating to the English version of the product may be desirable, as well as a different entry relating to all non-English versions of the product. The upgrade code 200, version identifier 202, and language code 204, constitute a product-identifying triplet. This product-identifying triplet is used to find matches, or "hits," against the upgrade table. If an installed product is a "hit" based on the product-identifying triplet, the attributes column in the upgrade table is examined. Example attributes include: coexist; and feature list migration. Property 208 is a global variable that is specified for each entry in the upgrade table. When there is a "hit" for an entry, property 208 is set.

Returning to FIG. 3, after the upgrade table is generated and stored in the upgrade installation file 130, an action list is generated and stored in the upgrade installation file. See block 132. The action list describes the steps to be performed by the installer program when performing the upgrade of the application program. The action list 180 (FIG. 4A) is a list of instructions for the upgrade installation. An example of an action list is shown in detail in FIG. 4C, and described next.

Figure 4C:
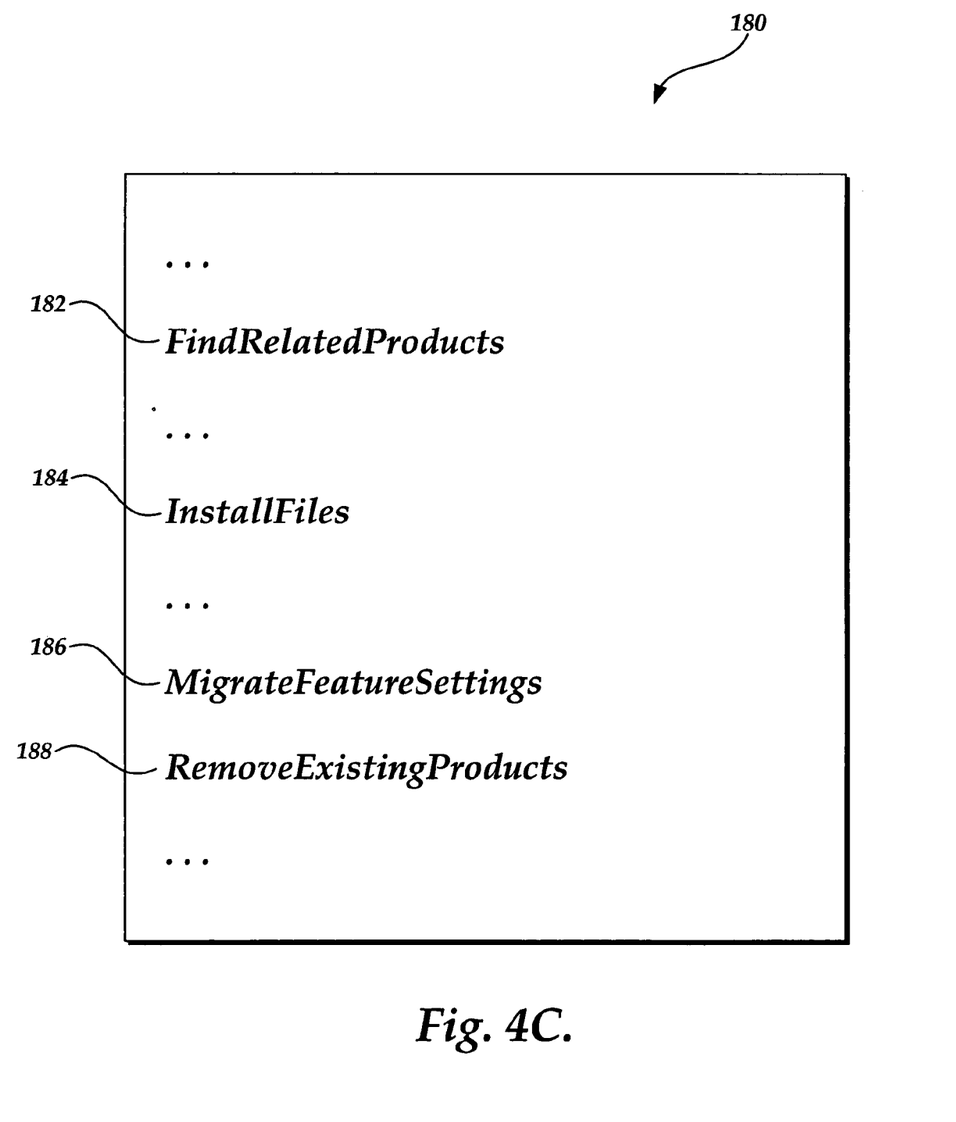
FIG. 4C is an example action list included in the upgrade installation file of FIG. 4A.

The action list illustrated in FIG. 4C includes: an action to FindRelatedProducts 182, an action to InstallFiles 184, an action to MigrateFeatureSettings 186, and an action to RemoveExistingProducts 188. The FindRelatedProducts 182 action triggers the installer program to find installed products based on a "hit" on an upgrade table entry. The InstallFiles action 184 instructs the installer program to install the files in the file identifier list (150 of FIG. 4A). The MigrateFeatureSettings action 186 is an instruction to the installer program to search the update table for any "hits", and check the upgrade table for the feature state attribute. If the feature state attribute is set to true, the installer program queries the existing product for feature states. If the product being installed has any feature states that map identically (i.e., have the same name) to feature states of an installed product, the settings for the previously installed settings will be used as the default settings for the product being installed. Custom logic can also be employed by the author to migrate feature settings, if necessary. The RemoveExistingProducts action is used to remove previous versions and/or related versions of the product being upgraded. A coexist attribute indicates that the previous or related products specified in the update table entry are not required to be removed. The RemoveExistingProducts action can come anywhere after the FindRelatedProducts and MigrateFeatureSettings actions. The author determines where to put this action. Placing this action prior to InstallFiles is safer but less efficient than placing this action after InstallFiles. Removing files prior to installing newer ones is safer because it essentially uninstalls the prior version before installing the upgrade. This is also less efficient because files that have not changed are removed and then installed again.

Referring again to FIG. 3, the logic next moves to block 134 where an upgrade installation package is created. The upgrade installation package includes the upgrade installation file shown in FIG. 4A, as well as any application files to be installed. The upgrade installation package is then made available to users. See block 136. Making the upgrade installation package available to users can be done in a variety of way, for example, by placing the information on a CD-ROM, or by placing the information on a network disk drive. The logic of FIG. 3 of authoring upgrade data and instructions then ends and processing is returned to FIG. 2.

Overview of Upgrade Installation Procedure

Figure 5:
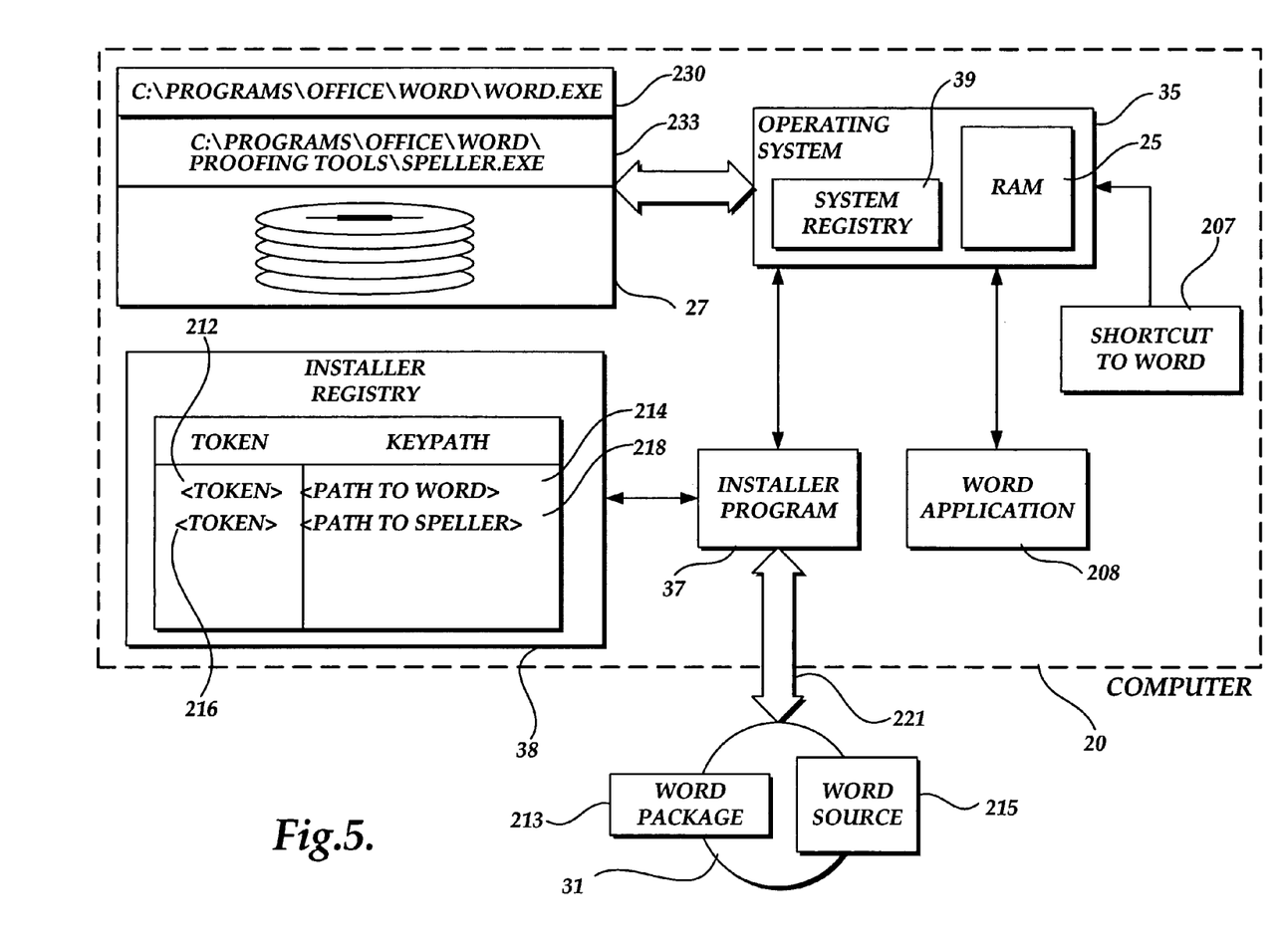
FIG. 5 is a system diagram of a computer environment including an exemplary installer program and associated programs and resources for installing an upgrade contained on a CD-ROM.

FIG. 5 is a system block diagram of a computer environment including an installer program 37 constructed in accordance with an exemplary embodiment of the present invention. The computer environment may be the conventional personal computer 20 including the installer program 37, a configuration database 38, an operating system 35, a hard-disk drive 27, a "shortcut" to an application 207, and an executing application 208. The executing application 208 shown in FIG. 5 is "Word," however, it will be appreciated that the upgrade installation procedure applies to any computer application.

Also illustrated are a package file 213 and a source 215. The package file 213 and the source 215 may reside on a CD-ROM disk 31 accessible to the computer 20 via an optical disk drive 30 (see FIG. 1). The package file 213 and the source 215 may also exist in any other location accessible by the computer 20. The package file 213 and the source 215 are discussed in further detail below. The functionality and construction of the installer program 37 is best described by example, through the upgrading of a product. It will be appreciated that the upgrading of a product is essentially the same as installing a product. When a product is installed, it is registered. In other words, the configuration database 38 is updated to include the installed product. If a product is already installed, the installed product is removed and unregistered, and the upgrade is installed and registered. The product-identifying triplet is used to find installed versions of the product or related products.

To begin, a user initiates the upgrade of the product, such as the Microsoft Word application program. Initiating the installation may constitute the act of inserting CD-ROM disk 31 in optical disk drive 30, or the act of executing a remote startup script over LAN 51, or any other means of initiating the installation. Once the upgrade is initiated, the installer program 37 assumes control of processing.

The installer program 37 begins the installation by reading the package file 213 into memory, such as RAM 25. The package file 213, also known as an upgrade installation file, is unique to the product and is essentially a database that describes, among other things, the relationships between the features, components, and resources of the product. The package file 213 may also include information defining several registry key values for entries in a system registry 39 maintained by the operating system 35. FIG. 4A illustrates an exemplary upgrade installation file, i.e., package file.

Still referring to FIG. 5, the installer program 37 reads the package file 213 and uses the information stored within to determine the upgrade operations that must be performed for the product. For instance, the installer program 37 may display a dialog box that presents the user with the option of canceling the upgrade and keeping the installed version of the product or removing existing versions of the product and related products and installing the upgrade. If the user opts to remove an installed version of the product, the installed version of the product is removed. Removal of a product includes updating or removing entries in the configuration database 38.

The source 215 contains the program files associated with the features of the application to be upgraded. Those program files making up the selected features are copied from the source 215 to an appropriate location on the computer 20, such as to the hard disk drive 27. If the user identifies a particular location within the file system of the hard disk drive 27 for a feature, the installer program 37 will write the program files associated with that feature to the identified location.

During the installation process, the installer program 37 creates several entries in both the system registry 39 and the configuration database 38. As discussed above, the configuration database 38 may be a portion of the system registry 39. When a program file is written to an appropriate location, the installer program 37 creates an entry in the configuration database 38 corresponding to the program file. The program file may be identified in that entry by a "token." The term "token" as used herein refers to any identifier capable of uniquely distinguishing one program file or component from other program files or components. Also in the entry, the path to that program file within the file system is associated with the token.

In the disclosed example, the product upgraded may include a program file 230 named "word.exe." The installer program 37 may copy the word.exe program file 230 from the source 215 to the location on the hard-disk drive 27 identified by the path "C:\Programs\Office\Word\." The installer program 37 then creates an entry in the configuration database 38 including a token 212 identifying the word.exe program file 230 and the path 214 to that program file. In a similar manner, the speller.exe file 233 may be written to the path "C:\Programs\Office\Word\Proofing Tools," and an entry in the configuration database 38 may be created with a token 216 identifying the speller.exe file 233, and a path 218 to the speller.exe file 233. In a like manner, the upgrade installation file is stored at an identified location, and the location of the upgrade installation file will be stored in the configuration database 38. Preferably, the upgrade installation file will replace the existing installation file, so that there is only one installation file for the product.

The installer program 37 continues with the upgrade installation process until all of the program files for the application are written to the appropriate locations on the computer 20. The installer program may also delete files as specified in the upgrade install instructions. When all of the program files are written, the upgrade is complete and the configuration database 38 is populated with an entry for each installed program file. In addition, the configuration database 38 includes summary information related to the installed state of the application, including which program files were installed, what version of the application is installed, and the like.

Installing An Upgrade

Figure 6:
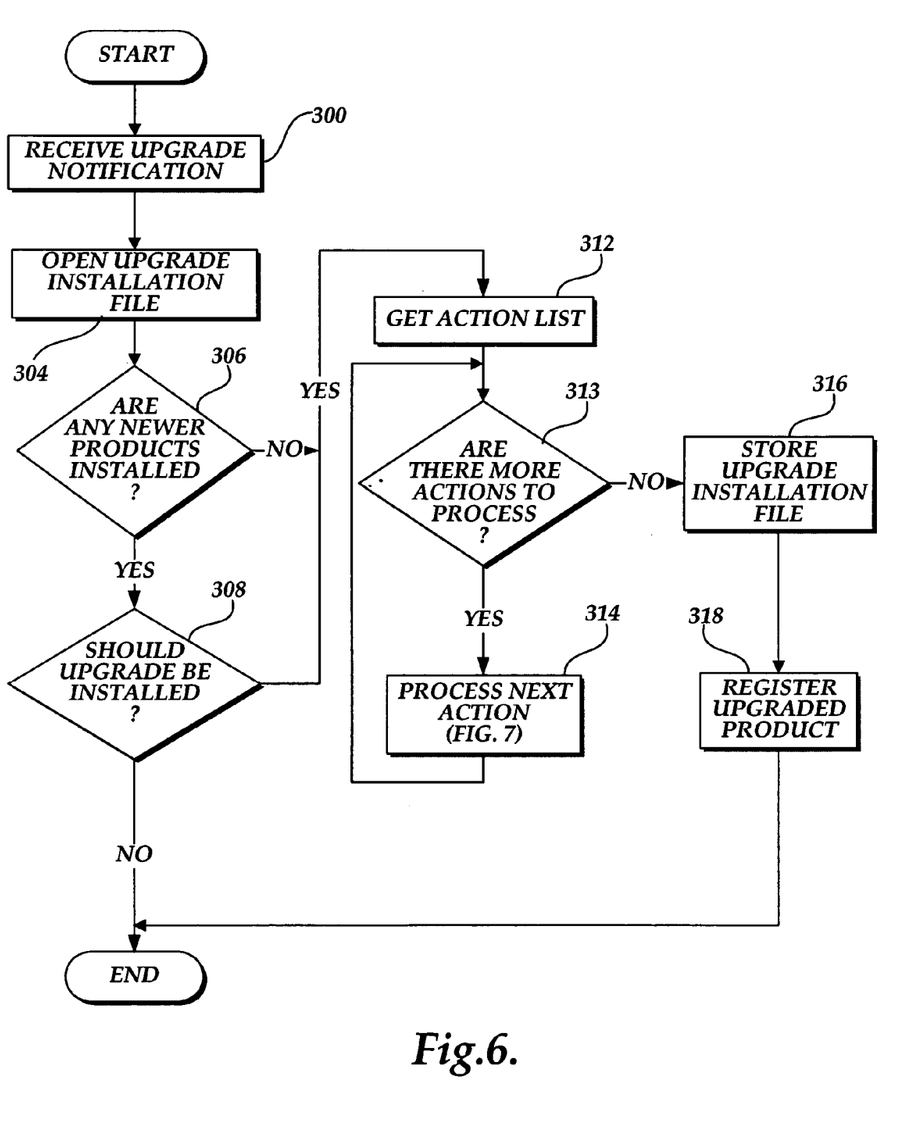
FIG. 6 is a flow diagram illustrating the overall logic performed by an installer program for upgrading an application program module performed in accordance with the present invention.

FIG. 6 is a flow diagram illustrating the overall logic used by an installer program 37 to install an upgrade in accordance with the present invention. The logic of FIG. 6 moves from a start block to block 300 where an upgrade notification is received. An upgrade notification is essentially the same as an installation notification. Such a notification alerts the installer program 37 to the fact that a complete application program is available for installation. If an existing version is already installed, the existing version will generally need to be removed. Hence, an upgrade is an installation of a product, coupled with the probable removal of a prior version of the product and/or removal of related products. Therefore, preferably, the notification of an upgrade or an installation is the same, and the installer program 37 makes the determination of whether an installation or an upgrade is required. A number of events may cause an upgrade notification, for example, a user may initiate an upgrade by running a set-up program. Next in block 304, the upgrade installation file is opened. In decision block 306, a test is made to determine if any newer products are installed. If so, the logic moves to decision block 308 where a test is made to determine if the upgrade should be installed. One way of making this determination is via a coexist attribute in the upgrade table. If it is determined that the upgrade should not be installed, the logic then ends.

If, however, it is determined that no newer products are installed (no in decision block 306) or that even though newer products are installed, the upgrade should be installed (yes in decision block 308), the logic moves to block 312 where the action list, such as the one shown in FIG. 4C, is obtained. The actions of the action list are then processed. In that regard, the logic moves to decision block 313 where a test is made to determine if there are more actions to process. If so, the next action is processed in block 314, which is shown in detail in FIG. 7, and described below. If there are no more actions to process, the upgrade installation file of FIG. 4A is then stored. See block 316. In general, an upgrade is used to replace an installed version of a product, in which case the upgrade package file replaces the installation file that is currently associated with the installed version of the product. The configuration database is then updated to show that the application program has been upgraded. See block 318. After the configuration database has been updated in either block 310 or 318, the logic of FIG. 6 of performing a program upgrade ends.

Figure 7:
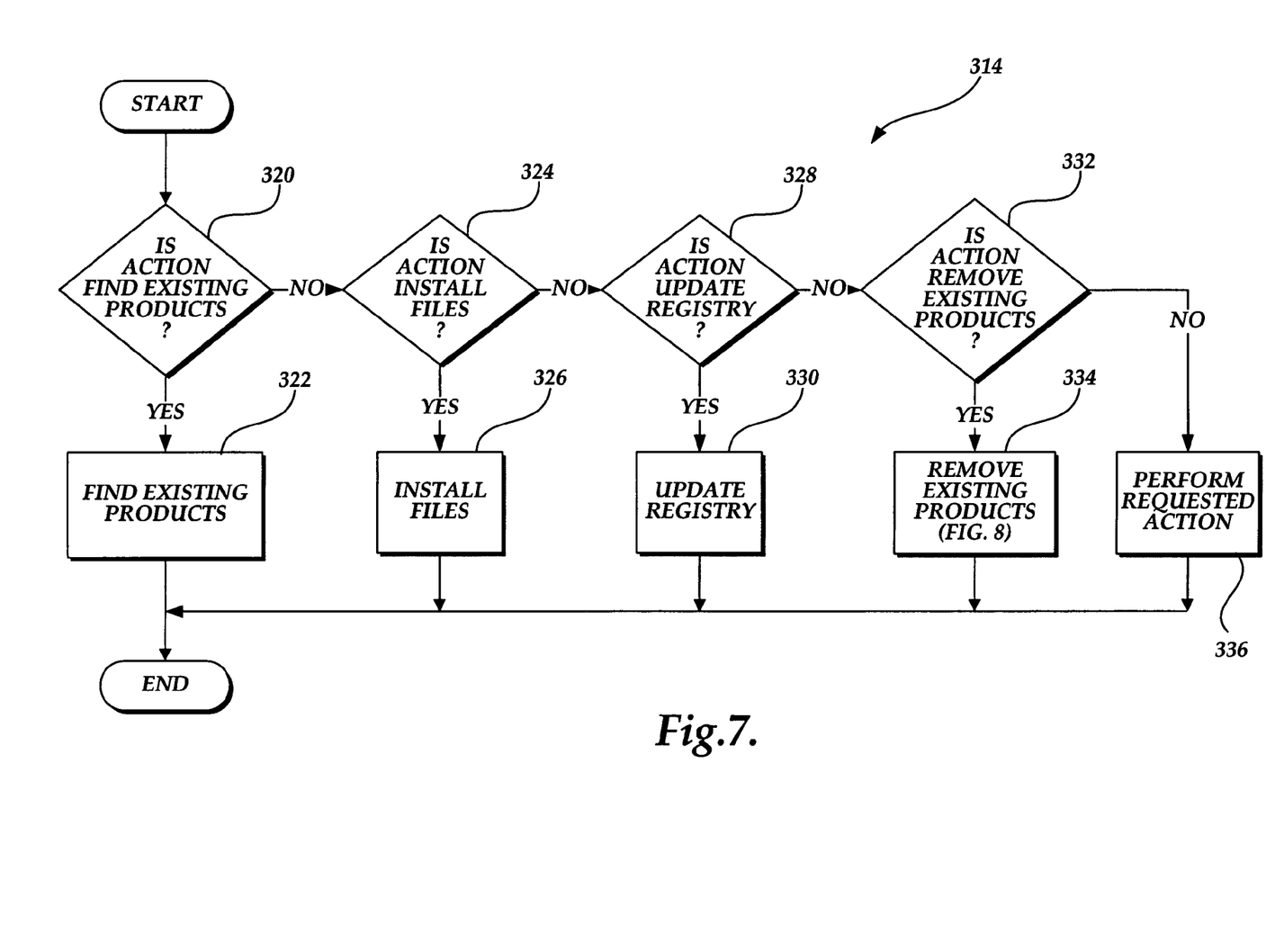
FIG. 7 is a flow diagram illustrating in detail the logic of processing an upgrade action.

The logic of processing an action in the action list 314 is illustrated in detail in FIG. 7. FIG. 7 illustrates a few of the key actions that can be included in an action list, such as the example shown in FIG. 4C. However, it will be appreciated that there are many other actions that can be included in an action list for an upgrade. In order to avoid undue repetition and unnecessarily expand this application and because upgrade actions are well known to those skilled in this area of computer technology, all possible upgrade actions are not set forth here.

The logic of FIG. 7 moves from a start block to decision block 320 where a test is made to determine if the action is find existing products. If so, the logic moves to block 322 to find existing products. As described in connection with FIG. 4C, this is accomplished by finding "hits" in the upgrade table. If not, the logic moves to decision block 324 where a test is made to determine if the action is install files. If so, the logic moves to block 326 where files are installed based on the file identifier list (150 in FIG. 4A). If not, the logic moves to block 328 where a test is made to determine if the action is to update the registry. If so, the registry is updated according to the registry list in the update table (160 in FIG. 4A). If not, the logic moves to decision block 332 where a test is made to determine if the action is remove existing products. If so, existing products are removed in block 334. The logic of removing existing products is illustrated in detail in FIG. 8 and is described below. If the action is not remove existing products, the logic moves to block 336 where the requested action is performed. As previously stated, there are many actions that can be used in an action list during an upgrade, only a representative sample are described here. Block 336 represents other not described actions. After the appropriate action has been performed (i.e., find existing products 322, install files 326, update registry 330, remove existing products 334, or perform requested action not listed above 336), the processing logic of FIG. 7 ends.

Figure 8:
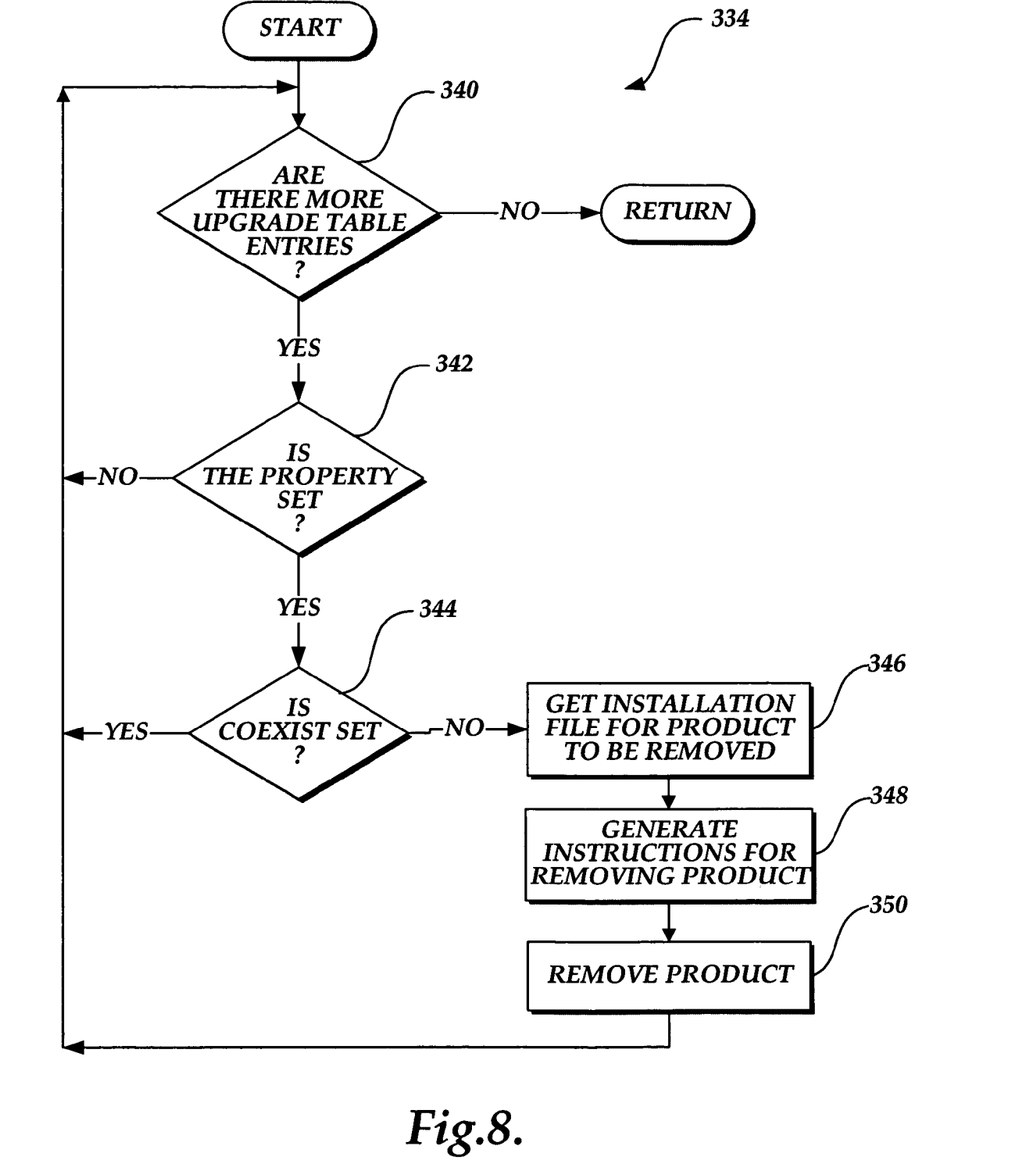
FIG. 8 is a flow diagram illustrating in detail the logic of the action of removing existing products.

The logic of removing existing products 334 is illustrated in detail in FIG. 8, and moves from a start block to decision block 340 where a test is made to determine if there are more upgrade table entries. If so, the logic moves to decision block 342 where a test is made to determine if the property is set for the upgrade table. If the property is set, there was a "hit" for the upgrade table entry. In other words, one or more products match the product-identifying triplet(s) of the upgrade table entry. If the property is set, the logic moves to decision block 344 where a test is made to determine if the coexist attribute is set to true for the upgrade table entry. If the coexist attribute is not set to true, the installed product or related product cannot coexist with the upgrade being installed, and must be removed. The logic then moves to block 346 where the installation file for the product to be removed is obtained. Next, in block 348 instructions for removing the produce are generated. When a product is installed, the installation file is saved. Similarly, when a product is upgraded the upgrade installation file is saved. Preferably, when an upgrade installation file is saved, it overwrites the existing installation file or upgrade installation file. Installation instructions for any subsequent patches are also stored. Thus, directions can be generated specifying how to remove any product that was installed, upgraded and patched using the installer program 37. The product is then removed in block 350. After the product is removed 350, or if the products can coexist (yes in block 344), or if the property is not set (no in block 342), the logic returns to block 340 to determine if there are more upgrade table entries. The logic of blocks 340 through 350 is repeated until it is determined in decision block 340 that there are no more upgrade table entries, at which point the logic of FIG. 8 of removing existing products ends, and processing returns to FIG. 7.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for creating a computer application upgrade package, comprising:
    (a) generating a property table that uniquely identifies a computer application upgrade and a group of applications related to the application upgrade;
    (b) generating a file-identifier list that identifies a plurality of files to be installed for the computer application upgrade;
    (c) generating a registry list that includes a plurality of registry keys and values to be stored for the computer application upgrade;
    (d) generating an upgrade table that indicates if installed versions of computer applications that are related to the computer application upgrade can coexist with the application upgrade, wherein applications that cannot coexist with the application upgrade are removed during the installation of the computer application upgrade;
    (e) generating an action list describing a method for installing the computer application upgrade; and
    (f) storing the property table, the file-identifier list, the registry list, the upgrade table and the action list.

2. A computer-readable medium having computer executable instructions for performing the method recited in claim 1.

3. A computer-readable medium comprising an upgrade package, wherein an upgrade package comprises:

(a) a property table that uniquely identifies a computer application upgrade and a group of applications related to the application upgrade;
(b) a file-identifier list that identifies a plurality of files to be installed for the computer application upgrade;
(c) a registry list that includes a plurality of registry keys and values to be stored for the computer application upgrade;
(d) an upgrade table that indicates if installed versions of computer applications that are related to the computer application upgrade can coexist with the application upgrade, wherein applications that cannot coexist with the application upgrade are removed during the installation of the computer application upgrade; and
(e) an action list describing a method for installing the computer application upgrade.

4. The computer-readable medium of claim 3, further comprising the plurality of files identified in the file-identifier list.

* * * * *